United States Patent [19]

Holderith

[11] 4,399,835

[45] Aug. 23, 1983

[54] WATER SAVING TOILET CONTROL VALVE

[76] Inventor: Anton Holderith, 833 W. Redondo Dr., Anaheim, Calif. 92801

[21] Appl. No.: 336,184

[22] Filed: Dec. 31, 1981

[51] Int. Cl.³ .......................................... F16K 31/26
[52] U.S. Cl. ..................... 137/414; 137/426; 137/433; 137/435; 137/436; 137/444
[58] Field of Search .............. 137/414, 422, 426, 435, 137/436, 433, 444

[56] References Cited

U.S. PATENT DOCUMENTS

| | | | |
|---|---|---|---|
| 289,388 | 12/1883 | Clark | 137/422 |
| 1,067,102 | 7/1913 | Failing | 137/426 |
| 2,911,000 | 11/1959 | Doyle | 137/414 |
| 2,986,155 | 5/1961 | Doyle | 137/414 |
| 3,074,684 | 1/1963 | Doyle | 137/414 |
| 3,495,803 | 2/1970 | Schoepe et al. | 137/414 |

Primary Examiner—George L. Walton
Attorney, Agent, or Firm—K. H. Boswell; Edward D. O'Brian

[57] ABSTRACT

A toilet holding tank water inlet valve of the type utilizing a flexible valve element formed as a portion of a pressure chamber and having a control stem associated with the pressure chamber and a pivot arm associated with the control stem is improved by molding a portion of the pressure chamber to tightly grip the control stem and attaching a vertical member to the pivot arm with a float which can move along the vertical member. An upper float stop is positioned near the uppermost end of the member and a lower float stop is positioned near the lowermost end of the member. As the float moves in response to movement of the water level within the holding tank, the float contacts the upper float stop as the tank is being filled and engages with this stop transferring the buoyant force exerted against the float by the water to the member which in turn moves the pivot arm re-positioning the control stem to effect a seal of a portion of the pressure chamber against a valve seat to inhibit further water influx into the holding tank. As the float moves downwardly with respect to the member as water is being drawn from the tank, the float contacts the lower stop and is momentarily suspended by it as the water level recedes below it. Then, the combined weights of the float, the member and the stops are transferred to the pivot arm which in turn are transferred to the control stem moving the control stem in the pressure chamber allowing the flexible valve element to unseat itself from a valve seat allowing water into the holding tank.

11 Claims, 6 Drawing Figures

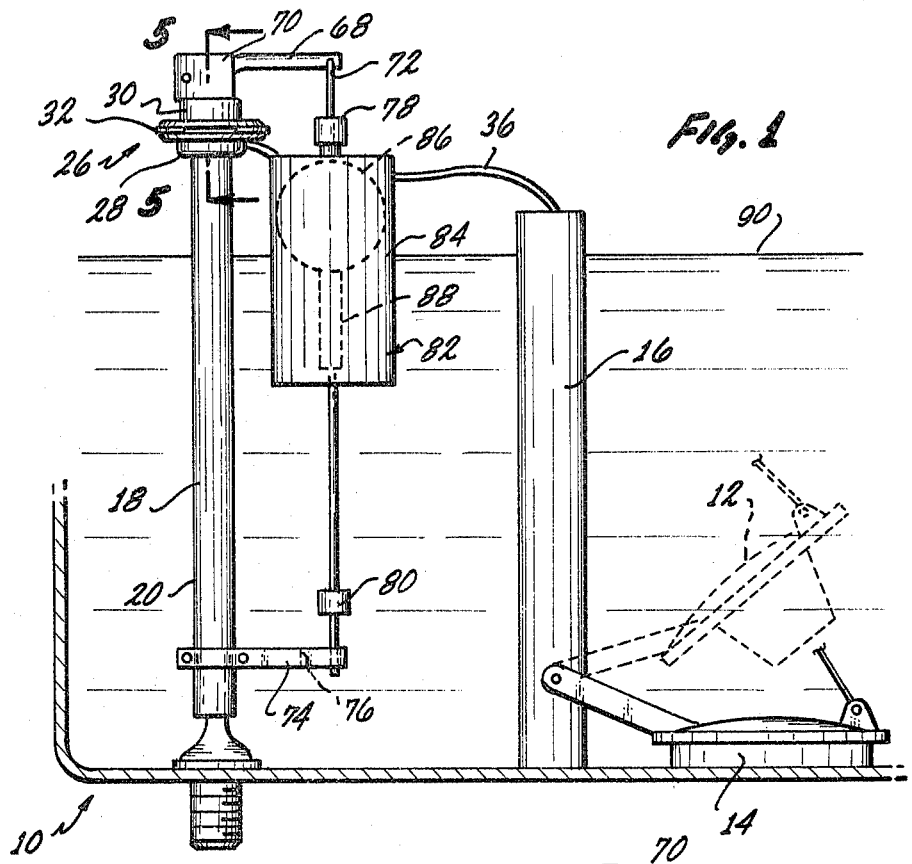
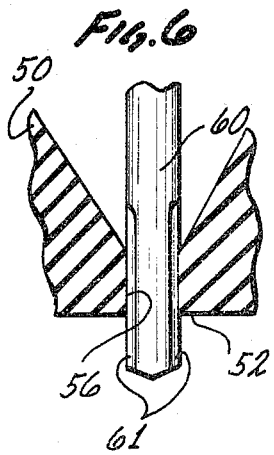
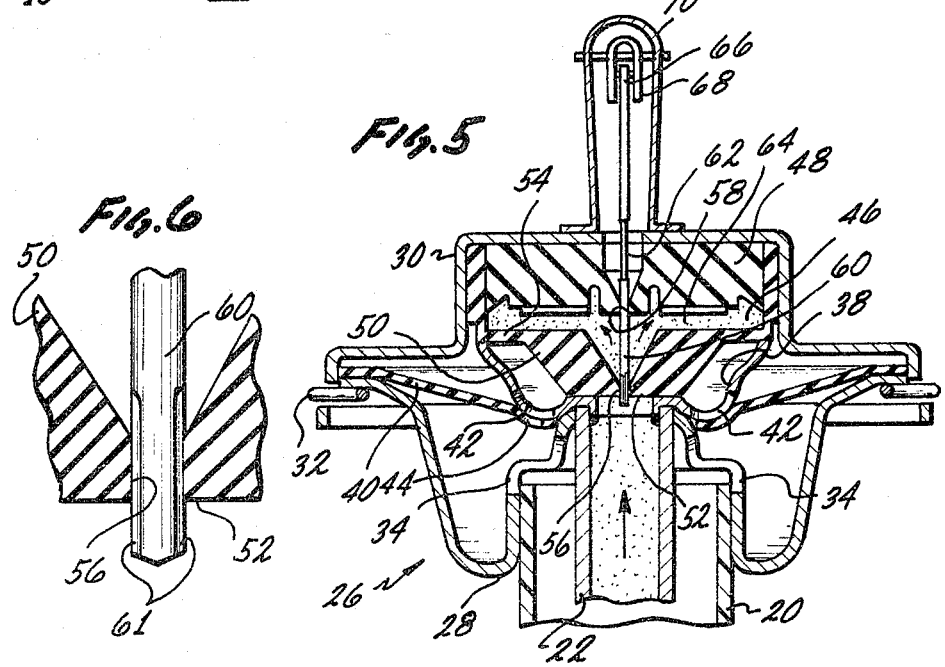

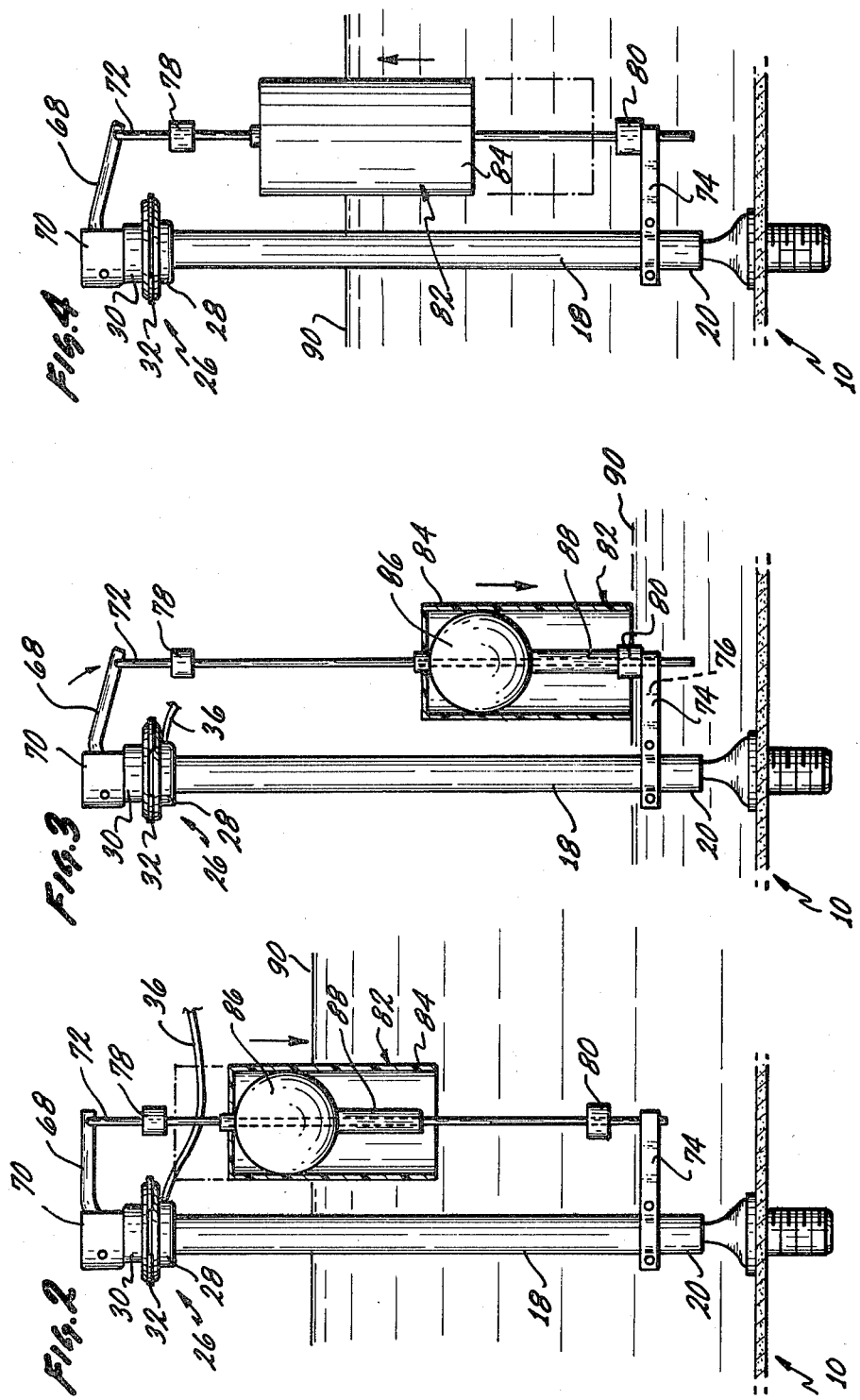

WATER SAVING TOILET CONTROL VALVE

BACKGROUND OF THE INVENTION

This invention is directed to an improvement in a toilet holding tank water inlet valve. The improvement inhibits discharge of refill water into the holding tank while the holding tank is actively being voided of water during transfer of water from the holding tank to the toilet bowl. The water inlet valve is not open until the holding tank is almost depleted of its charge of water resulting in substantial savings of water usage during each actual flushing of the toilet.

In U.S. Pat. No. 2,808,850 a ball-cock valve is disclosed which utilizes a pressure chamber, a portion of which is flexible, as the sealing member against a valve seat on the water inlet supply pipe. This valve has many advantages over other types of toilet water inlet valves. It is quiet in function, it is very positive in its action in controlling water discharge from the water inlet supply pipe and it operates in conjunction with water inlet supplies of varying water pressures.

Water has always been a precious commodity in the arid portions of the world. With the recent droughts in what are normally wet areas such as the Eastern seaboard of the United States, it is also being recognized that generally water is a precious commodity which must be conserved and utilized wisely. As the populations increase, a great stress is put on the water supply of any particular geographical area. The solution of these stresses and the prevention of water shortages lies in wise use and conservation of the existing water supply.

The modern water closet or toilet is designed for efficient waste removal by discharging a set volume of water from its water holding tank through its bowl. Normally, the amount of water discharged from the holding tank into the bowl during any one flush is of a volume more than sufficient to insure complete flushing of the bowl. During local water shortages. it has even been the practice to reduce the volume of water which can be held within the holding tank by adding solid, dense objects to the holding tank such as bricks or the like. Recently, commercially available plastic barriers have been developed which can be inserted into the holding tank to reduce its volume without inhibiting its function in supplying an adequate supply of water to the bowl for complete flushing.

Notwithstanding any of the water saving measures noted above, valve in U.S. Pat. No. 2,808,850 as well as all other commonly used water inlet valves for toilets suffer a common defect which results in a waste of water which can no longer be tolerated in view of the decreasing availability of water and its status as a precious commodity. The water inlet valve of patent 2,808,850 as well as other water inlet systems all utilize a float or the like which floats on the surface of the water within the holding tank and as the surface of the water within the holding tank descends downwardly during transfer of water from the holding tank to the bowl the water inlet valve is prematurely opened while water is being transferred from the holding tank to the bowl.

The valve of U.S. Pat. No. 2,808,850 utilizes a positive opening and closing of the valve which can essentially be described as either being off or on. The valves of other inlet systems are such that as the float slowly descends the valve is incrementally opened and varies from a small influx of water when the water level is very high to a large influx of water through the valve as the float descends and the valve is fully opened. In any event, in all of the known water inlet valves commonly utilized for toilets, the water inlet valve is actively introducing water into the holding tank as water is being transferred from the holding tank to the bowl.

The volume of the holding tank, normally 4 gallons, is sufficient such that it is not necessary to insure adequate flushing to augment this volume with additional water being introduced as noted in the previous paragraph. The flushing time, i.e., the time of transfer from the holding tank to the bowl, depends upon the flow of the water through the orifice located between the holding tank and the bowl. Normally, the transfer time necessary for complete movement of the water from the holding tank to the bowl is typically of about 15 seconds. During this time, all of the known water inlet valves, including that of U.S. Pat. No. 2,808,850, dischrge water into the holding tank which is in effect wasted water. The amount of water prematurely discharged into the holding tank during active transfer of water from the holding tank to the bowl typically is about 6/10ths of a gallon. It can be seen that when this 6/10ths of a gallon figure is multiplied by the number of times a toilet is flushed per day which in turn is multiplied by the number of toilets in any one geographical area, that the amount of water wasted each day in any particular geographical area can amount to a very significant percentage of the total usage of water of that geographical area.

BRIEF DESCRIPTION OF THE INVENTION

In view of the above, it is a broad object of this invention to provide a water inlet valve which is capable of inhibiting the needless waste of water resulting from premature introduction of water into the holding tank during active transfer of water from the holding tank to the bowl of a toilet. It is a further object of this invention to improve the water inlet valve of the type described in U.S. Pat. No. 2,808,850. Additionally, it is a further object of this invention that the improved valve be engineered such that it will function in the desired manner with little or no maintenance for the lifetime of the valve and can be manufactured in an economical manner such that the improved valve can be available to a wide segment of the population.

These and other objects as will become evident from the remainder of this specification are achieved in an improvement in a toilet holding tank water inlet valve of the type attaching to an upstanding water inlet supply pipe located in said holding tank, said inlet valve having a valve seat located in association with said inlet supply pipe, a flexible valve element formed as a part of a pressure chamber and operatively associated with said valve seat, said pressure chamber including an opening, a valve stem operatively associated with said opening in said pressure chamber and having a closed position wherein said flexible valve element forms a seal against said valve seat and an open position wherein said flexible valve element is spaced away from said valve seat, a pivot arm attaching to said valve in operative association with said valve stem and being located in a first position with respect to said valve when said valve stem is in its closed position and a second position when said valve stem is in its open position which comprises: retarding means located in operative association with said valve stem and capable of retarding movement of said valve stem; a vertically oriented member capable of moving reciprocally along an essentially vertical axis, said member having ends and operatively attaching to said pivot arm adjacent to its upper end, said pivot arm moving between its first and second positions in response to movement of said member along said axis; means associated with said member for retaining it in said vertical orientation; a buoyant float means movably associated with said member and capable of reciprocally moving vertically with respect to said member in response to the water level in said holding tank between an upper float position when the water level in said holding tank is at a filled level, at least one intermediate float position and a lower float position when the water level in said holding tank is at a depleted level; an upper float engagement means operatively associated with said member proximal to the uppermost end of said member; a lower float engagement means operatively associated with said member proximal to the lowermost end of said member; the combined weights of said member, said upper float engagement means and said lower float engagement means incapable of transferring sufficient force through said pivot arm to move said valve stem against said retarding means from its closed position to its open position; said float means capable of engaging said upper float engagement means as said float means moves from said intermediate position to said upper float position under the buoyant force exerted on it by water as said holding tank fills with water such that said pivot arm is moved from its second position to its first position moving said valve stem against said retarding means to its closed position resulting in said flexible valve element forming a seal with said seat; said float means capable of engaging said lower float engagement means as said float means moves from said intermediate position to said lower float position in response to removal of water from said holding tank such that when said water level in said holding tank is at said depleted level the combined weights of said float means, said member, and said upper and said lower engagement means move said pivot arm from its first position to its second position moving said valve stem against said retarding means to its open position and disrupting said seal between said flexible element and said valve seat.

In the preferred form of the invention, the retarding means comprises sizing the opening in the pressure chamber such that the valve stem is frictionally engageable within the opening.

In the preferred form of the invention, the float means would comprise a buoyant body having a vertically oriented bore passing through the body such that the body can be located around the member with the member passing through the bore allowing the body to freely slide vertically along the length of the member in response to changing of water level within the holding tank.

The preferred form of the means associated with the member for retaining it in the vertical orientation would comprise a guide means attaching to the water supply pipe and extending outwardly toward the member. The member would be slidably associated with the guide means such that the lower end of the member slides within the guide means to maintain the vertical orientation of the member.

Preferredly, both the upper and lower float engagement means would be adjustable in position such that the point at which the float body engages these engagement means is adjustable to allow variability in the positions of the float wherein the water inlet supply valve is opened and closed. This would allow for adaptation of the improved valve to many existing styles of toilets and allow for application of the improvement to holding tanks which because of their cross-sectional area had different optimum fill and depleted levels.

The float body can be constructed as a cylinder having an opened bottom end in which air can be entrapped with a buoyant dense body located within the cylinder. As so constructed, activation of the water inlet valve after the water is discharged from the holding tank is coordinated.

BRIEF DESCRIPTION OF THE DRAWINGS

This invention will be better understood when taken in conjunction with the drawings wherein:

FIG. 1 is a side elevational view in partial section of a portion of a holding tank for a toilet;

FIG. 2 is a side elevational view in section of a portion of FIG. 1 showing certain components of FIG. 1 in a different spacial relationship than is shown in FIG. 1;

FIG. 3 is a side elevational view in partial section of the components seen in FIG. 2 with certain of these components in still a further spacial configuration than that of FIG. 2;

FIG. 4 is a side elevational view in partial section of the components of FIG. 2 with certain of these components shown in still a further spacial configuration than seen in FIGS. 2 and 3;

FIG. 5 is a side elevational view in section about the line 5—5 of FIG. 1; and

FIG. 6 is a side elevational view of a portion of FIG. 5.

This invention utilizes certain principles and/or concepts as are set forth in the claims appended to this specification. Those skilled in the plumbing arts will realize that these principles and/or concepts are capable of being utilized in a variety of embodiments different from the exact embodiment utilized for illustrative purposes herein. For this reason, this invention is not to be construed as being limited to the exact illustrative embodiment herein but is to be construed only in light of the claims.

DETAILED DESCRIPTION

Referring to the figures in FIG. 1, a portion of the water closest holding tank 10 is shown. To the right of the figure shown in phantom lines is a flapper valve 12 shown in an up position as it would be immediately upon flushing of the toilet. Located directly below the flapper valve 12 is the valve seat 14 against which the flapper valve 12 seats. Insofar as neither the flapper valve 12 or the valve seat 14 form a part of this invention and are conventional in manner, no further description of these need be given, it being understood that they function in a conventional manner.

Located to the left of flapper valve 12 is the overflow tube 16. As with the flapper valve 12, the overflow tube 16 is a conventional overflow tube and its function need not be described in detail. To the left of the overflow tube 16 is a water supply tube 18. The water supply tube 18 is also a conventional water supply tube including two co-axial tubes 20 and 22. Tube 22 has a common nipple 24 at its lower end which mates with the water line to supply water to the holding tank 10 in the conventional manner. Tube 20, which surrounds tube 22, it utilized in a conventional manner to direct water which has passed through the water inlet valve 26 downward to the bottom of the holding tank 10 in order to inhibit, in the conventional manner, excessive noise during filling of the holding tank 10.

Referring now to FIg. 5, there is shown a water inlet valve 26 which is related to the illustrated embodiments of the ball-cock valves as disclosed and used in U.S. Pat. No. 2,808,850, the entire contents of which are incorporated herein. The water inlet valve 26 functions as does the inlet valves described in that patent with one noted exception as explained below.

In valve 26 a lower housing 28 is mated with an upper housing 30 by a spring clip 32. Use of the spring clip 32 allows for maintenance of these two housing members 28 and 30 in association with each other yet allows for separation of the same for cleaning of the water inlet valve 26. The lower housing 28 additionally mates with the upper end of the tube 20 and is frictionally held thereon. Several holes, collectively identified by the numeral 34, are formed in the lower housing 28 to allow for flow of water from within the lower housing 28 into and down the space between the inside of the tube 20 and the outside of the tube 22 for discharge into the holding tank 10. Additionally, a bowl refill tube 36 communicates with the interior of the lower housing 28 and transfers refill water from the interior of the lower housing 28 to the overflow tube 16.

A valve seat 38 is formed on the upper end of the inlet tube 22. A flexible membrane 40 is located below the valve seat 38. The valve seat 38 contains several openings collectively identified by the numeral 42 which allow for water flow from the interior of the valve seat 38 toward the flexible membrane 40. The flexible membrane 40 in turn also includes several holes, one of which, hole 44, is shown. Water passing through holes 42 and 44 allows for transfer of water from the interior of the valve seat 38 to the interior of the lower housing 28 for discharge down between the space between the tubes 20 and 22.

A pressure chamber 46 formed in part by upper chamber member 48 and formed in its remaining part by lower chamber 50 is located within the upper housing 30. The outside perimeter of the lower chamber member 50 is frictionally fit within the upper housing 30 and is maintained therein. The lower perimeter 52 of the lower chamber member 50 seats against and can seal agaisnt the valve seat 38. The wall 54 of the lower chamber member 50 is flexible allowing for movement of the lower periphery 52 toward and away from the valve seat 38. The above described functions are performed in the manner described in U.S. Pat. No. 2,808,850.

The lower chamber member 50 includes a hole 56 centrally located therein. The upper chamber member 48 includes a hole 58 centrally located therein. A valve stem 60 passes through these two holes. The valve stem 60 includes a wasted section 62 which is of a smaller diameter than the remainder of the valve stem 60. A chamber 64 is formed internally between the upper and lower chamber members 48 and 50. As seen in FIG. 6, the valve stem 60 incudes grooves, collectively identified by the numeral 61, on its lower end which allow for water to be forced into pressure chamber 64.

Contrary to U.S. Pat. No. 2,808,850, the hole 58 in upper chamber member 48 is formed such that its internal diameter is smaller than the external diameter of valve stem 60. This causes valve stem 60 to frictionally engage hole 58 which inhibits movement of the valve stem 60 in the hole 58. By undersizing hole 58 about 0.002 inches, the proper degree of frictional engagement is achieved while still allowing for movement of the valve stem 60 in the hole 58 when sufficient force is applied to it by pivot arm 68.

In FIG. 5, the valve stem 60 is so located in the holes 56 and 58 that the chamber 64 is sealed to the ambient environment around hole 58 but is open to water in pipe 22 by the grooves 61. Because of the water pressure in the chamber 64 transmitted from pipe 22, when the valve stem 60 is positioned, as seen in FIG. 5, the wall 54 of the lower chamber member 50 is inhibited from flexing upward. This maintains the lower periphery 52 of the lower chamber 50 against the valve seat 38 and, in turn, inhibits water flow upwardly through the tube 22 and out the valve seat 38. If the valve stem 60 is allowed to descend, the wasted section 62 of the valve stem 60 becomes located within the hole 58. The wasted section 62 of the valve stem 60 is of a smaller diameter than is the hole 58. This allows for fluid movement through the hole 58 out of the chamber 64. When the valve stem 60 is so positioned such that the wasted section 62 is located within the hole 58, the fluid within chamber 64 is in communication with the ambient and the chamber 64 is no longer pressurized. This allows for flexure of the wall 54 and upward movement of the lower periphery 52 of the lower chamber member 50. This removes this lower periphery 52 out of its sealing engagement with the valve seat 38 and allows for water to flow upwardly within the tube 20 out and into the valve seat 38 and from there into the lower housing 28 as previously described. It can thus be seen that the water inlet valve 26 will either be opened or closed depending upon the position of the valve stem 60.

For the purposes of the remainder of this specification, when the valve stem 60 is positioned as is seen in FIG. 5, it will be considered to be in a closed position. If the valve stem 60 is moved downwardly from its position as seen in FIG. 5, it will be considered to be in an open position. The upper end 66 of the valve stem 60 is pivotally attached to a pivot arm 68. The pivot arm 68 is in turn pivotally attached to a U-shaped housing 70 which is formed on the top of upper housing member 30. This allows for control of the position of valve stem 60 depending upon movement of the pivot arm 68. Referring now to FIGS. 2 and 3, when the pivot arm 68 is as shown in FIG. 2, it will be said to be in a first position and when it is as seen in FIG. 3, it will be said to be in a second position. Thus, when the pivot arm 68 is in its first position the valve stem 60 is in its closed position and when the pivot arm 68 is in its second position the valve stem 60 is in its open position.

A vertical member 72 is vertically oriented and is attached at its upper end to pivot arm 68. The member 72 is attached to the pivot arm 68 such that it can pivot with respect to the pivot arm 68. Attaching to and projecting outwardly from the tube 22 is a guide member 74. Guide member 74 has a hole 76 seen in phantom in FIG. 1 which allows the member 72 to freely slide in the hole 76. As can be seen in comparing FIGS. 2 and 3, the lower end of the member 72 is free to slide through the hole 76 in the guide member 74 depending upon the position of the member 72.

An upper float stop 78 is attached to the member 72 near the upper end of the member 72. A lower float stop 80 is attached to the member 72 near its lower end. The upper and lower float stop 78 and 80 can be fixedly formed on the member 72, however, preferredly they will be movable on the member 72 to allow for adjustment of the limits of movement of the float 82 as hereinafter described. The float stops 78 and 80 can simply frictionally engage the member 72 to allow for variable adjustment in position on the member 72 or they could include appropriate set screws or the like (not separately shown or numbered) to allow for more securely locating them in fixed positions on member 72. Alternately, they could be fixed in a set position on member 72 by appropriate solvent welding, spot welding or the like.

The float 82 is preferredly formed as an inverted cylindrical chamber 84 with a buoyant but dense body 86 located therein. A tube 88 internally formed with chamber 84 passes through body 86 allowing for positioning of the float 82 about the member 72 bypassing member 72 through tube 88. The internal dimension of the tube 88 is greater than the external dimension of the member 82 allowing for free movement of the float 82 upwardly and downwardly along the length of the member 72.

The improved valve of this invention functions as follows. Assuming that the holding tank 10 is full of water and the handle (not shown or identified) controlling the flapper valve 12 is activated, the flapper valve 12 lifts up from the valve seat 14 allowing discharge of water from the holding tank 10. Normally, prior to this operation the water level 90 within the holding tank 10 would be at its filled level. This would position the float 82 in a position as seen in FIG. 1.

Upon activation of the flapper valve 12 such that the volume of water being held in the holding tank 10 is discharged through the valve seat 14, the float 82 descends as the water level 90 moves down as is seen in FIG. 2. At this time, however, the lever arm 68 and the valve stem 60 to which it is attached are in their first and closed positions, respectively, and no water flows through the water inlet valve 26 into the tank 10. The only water thus being discharged from the holding tank 10 is that volume of water which it originally held prior to activation of the flapper valve 12. As the water level 90 descends to a point where the holding tank 10 is almost depleted, the tube 88 within the float 82 contacts the lower float stop 80. Further withdrawal of water from the holding tank 10 lessens the buoyant force of this water on the float 82 and the weight of the float 82 is progressively taken up by the lower float stop 80. The force of this weight is transferred to the member 72.

The member 72, the upper float stop 78 and the lower float stop 80 are of insufficient weight themselves to cause downward movement of the pivot arm 68 from its first position to the second position because of the frictional engagement of valve stem 60 in hole 58. However, when the weight of the float 82 is added to their weight as the buoyancy of the float 82 is lost because of the water level descending below it, the combined weights of the float 82, the member 72 and the upper and lower float stops 78 and 80 is sufficient to overcome the frictional engagement of valve stem 60 in hole 58 and to move the pivot arm 68 from its first position to its second position. As will be remembered from above, this concurrently moves the valve stem 60 from its closed position to its open position and allows for water to flow through the water inlet valve 26. The inlet valve 26 opens just prior to the water level within the holding tank 10 reaching its depleted level, i.e., a level governed by the vertical position of the valve seat 14. The flapper valve 12 closes and with the valve stem 60 in its open position, the holding tank 10 is now refilled by water flowing through the water inlet valve 26. As the water level rises, as can be seen in FIG. 4, it once again supplies a buoyant force to the float 82 causing the float 82 to be lifted upwardly from the lower float stop 80 and rise with the increasing rise in the water level 90.

As the water level 90 approaches its filled level, the float 82 is buoyed upward and abuts against the upper float stop 78. Continued rising of the water level 90 causes the buoyant force of the float 82 in the water to be transferred to the upper float stop 78 which in turn causes upward movement of the member 72. This moves the pivot arm 68 from its second position to its first position which in turn moves the valve stem 60 from its open position to its closed position and this in turn stops the flow of water through the water inlet valve 26. The water level 90 is now at its filled level and the holding tank 10 is once again ready for discharge. The buoyant force of the water on the float 82 is sufficient to overcome the frictional fit between valve stem 60 and hole 58 and allows for movement of the valve stem 60 in the hole 58.

It can be seen by the above description that the water inlet valve 26 is only allowing for introduction of water into the holding tank 10 after the major portion of water has been discharged from the holding tank 10. During the time period between when the float 82 contacts the lower float stop 80 opening the inlet valve 26 and when the flapper valve 12 closes and seals against the valve seat 14 a small amount of water is discharged through the hose 36 into the overfill tube 16. This amount of water is a sufficient quantity to raise the level of the water within the toilet bowl (not numbered or seen) to its preferred level for proper functioning. During the discharge of water from the holding tank 10 to the toilet bowl, no additional water is added to the volume of water within the holding tank 10 and thus is not lost through the valve seat 14 to the bowl or through the overflow pipe 16 to the bowl.

I claim:

1. An improvement in a toilet holding tank water inlet valve of the type attaching to an upstanding water inlet supply pipe located in said holding tank, said inlet valve having a valve seat located in association with said inlet supply pipe, a flexible valve element formed as a part of a pressure chamber and operatively associated with said valve seat, said pressure chamber including an opening, a valve stem operatively associated with said opening in said pressure chamber and having a closed position wherein said flexible valve element forms a seal against said valve seat and an open position wherein said flexible valve element is spaced away from said valve seat, a pivot arm attaching to said valve in operative association with said valve stem and being located in a first position with respect to said valve when said valve stem is in its closed position and a second position when said valve stem is in its open position which comprises:

retarding means located in operative association with said valve stem and capable of retarding movement of said valve stem;

a vertically oriented member capable of moving reciprocally along an essentially vertical axis, said member having ends and operatively attaching to said pivot arm adjacent to its upper end, said pivot arm moving between its first and second positions in response to movement of said member along said axis;

means associated with said member for retaining it in said vertical orientation;

a buoyant float means movably associated with said member and capable of reciprocally moving vertically with respect to said member in response to the water level in said holding tank between an upper float position when the water level in said holding tank is at a filled level, at least one intermediate float position and a lower float position when said water level in said holding tank is at a depleted level;

an upper float engagement means operatively associated with said member proximal to the uppermost end of said member;

a lower float engagement means operatively associated with said member proximal to the lowermost end of said member near said depleted water level;

the combined weights of said member, said upper float engagement means and said lower float engagement means incapable of transferring sufficient force through said pivot arm to move said valve stem against said retarding means from its closed position to its open position;

said float means capable of engaging said upper float engagement means as said float means moves from said intermediate position to said upper float position under the buoyant force exerted on it by water as said holding tank fills with water such that said pivot arm is moved from its second position to its first position moving said valve stem against said retarding means to its closed position resulting in said flexible valve element forming a seal with said valve seat;

said float means capable of engaging said lower float engagement means as said float means moves from said intermediate position to said lower float position in response to removal of water from said holding tank such that when said water level in said holding tank is at said depleted level the combined weights of said float means, said member and said upper and said lower engagement means move said pivot arm from its first position to its second position moving said valve stem to its open position and disrupting said seal between said flexible valve element and said valve seat.

2. The improved valve of claim 1 wherein:
said retarding means comprises sizing said opening in said pressure chamber such that said valve stem is frictionally engagable within said opening.

3. The improved valve of claim 2 wherein:
said float means comprising a buoyant body having a vertically oriented tube passing through said body, said body located around said member such that said member passes through said tube.

4. The improved valve of claim 3 wherein:
said means associated with said member for retaining it in said vertical orientation comprises a guide means attaching to said water inlet supply line, said member slidably associated with said guide means.

5. The improved valve of claim 4 wherein:
said upper float engagement means is capable of being positioned on the upper periphery of said member in a variety of positions such that said engagement of said float body with said upper float engagement means is variable with respect to the position of said upper float engagement means on said member.

6. The improved valve of claim 5 wherein:
said lower float engagement means is capable of being positioned in a variety of positions on said member such that said engagement of said float body with said lower float engagement means is variable with respect to the position of said lower float engagement means on said member.

7. The improved valve of claim 2 wherein:
said means associated with said member for retaining it in said vertical orientation comprises a guide means, said guide means operatively associated with said water inlet supply pipe and extending outwardly from said water inlet supply pipe esentially parallel to said pivot arm when said pivot arm is in its first position toward said member and operatively connected to said member.

8. In combination with a water closet of the type having a bowl and a water holding tank connecting to said bowl and wherein said holding tank includes a vertically oriented upstanding water pipe located within said holding tank and a holding tank water inlet valve located on the uppermost end of said supply pipe with said valve including a pivot arm forming a part thereof an improvement which comprises:

said valve being located on said supply pipe at a position above the filled water level in said tank;

said pivot arm being elongated and having ends and being pivotally attached to said inlet valve proximal to one of its ends with the other of its ends movable between an upwardly displaced closed position and a downwardly displaced open position;

a vertically oriented linking means capable of moving reciprocally along an essentially vertical axis, said linking means having ends and operatively attaching to said pivot arm adjacent to its upper end, said pivot arm moving between its upwardly displaced closed position and its downwardly displaced open position in response to movement of said linking means along said axis;

a buoyant float means movably connected to said linking means, said movable float means capable of reciprocally moving vertically within said holding tank in response to movement of the water level in said holding tank as said water level in said holding tank moves between a filled level and a depleted level;

a float engagement means operatively connecting said buoyant float means to said linking means and capable of transferring movement of said buoyant float means to said linking means;

said valve including a valve stem, said valve stem operatively connecting to said pivot arm and movable between a first and a second position in response to said pivot arm moving between its upwardly displaced closed and downwardly displaced open positions;

a retarding means located in operative association with said valve stem and capable of retarding movement of said valve stem between its said first and second positions;

the combined weights of said linking means and said float engagement means incapable of transferring sufficient force through said pivot arm to move said valve stem against said retarding means from its first position to its second position;

said buoyant float means capable of interacting with said float engagement means in a first manner as said water level approaches said filled level from said depleted level and said float engagement means in turn interacting with said pivot arm through said linking means with said interaction of said buoyant float means and said float engagement means moving the other end of said pivot arm to said upwardly displaced closed position with said water level arriving at said filled position, said buoyant float means capable of interacting with said float engagement means in a second manner as said water level approaches said depleted level from said filled level and said float engagement means again in turn interacting with said pivot arm through said linking means with said interaction of said buoyant float means and said float engagement means moving the other end of said pivot arm to said downwardly displaced open position concurrently with said water level arriving at said depleted position such that said valve is open when said water level is at said depleted position and when said water level is moving from said depleted position towards said filled position and said valve is closed when said water level is at said filled position and when said water level is moving from said filled position to said depleted position.

9. The combination of claim 8 wherein:

said linking means includes a vertically oriented elongated member.

10. The combination of claim 9 wherein:

said valve includes a valve seat located in association with said inlet supply pipe, said valve further including a flexible valve element formed as a part of a pressure chamber and operatively associated with said valve seat, said pressure chamber including an opening;

said valve stem operatively associated with said opening, said valve being in said closed position when said valve stem is in a first position with respect to said opening and said valve being in an open position when said valve stem is in a second position with respect to said opening.

11. The combination of claim 10 wherein:

said float engagement means includes an upper float engagement means and a lower float engagement means, said upper float engagement means operatively associated with said member proximal to the uppermost end of said member, said lower float engagement means operatively associated with said member proximal to the lowermost end of said member;

said float means capable of engaging said upper float engagement means as said float means moves under the buoyant force exerted on it by water as said holding tank fills with water such that when said water in said holding tank is at said filled position said pivot arm is moved from its downwardly displaced open position to its upwardly displaced closed position moving said valve stem against said retarding means to said valve stems closed position resulting in said flexible valve element forming a seal with said valve seat;

said float means capable of engaging said lower float engagement means as said float means moves in response to removal of water from said holding tank such that when said water level in said holding tank is at said depleted level the combined weights of said float means, said member and said upper and said lower engagement means move said pivot arm from its upwardly displaced closed position to its downwardly displaced open position moving said valve stem to said valve stem open position and disrupting said seal between said flexible valve element and said valve seat.

* * * * *

UNITED STATES PATENT AND TRADEMARK OFFICE
CERTIFICATE OF CORRECTION

PATENT NO. : 4,399,835
DATED : AUGUST 23, 1983
INVENTOR(S) : ANTON HOLDERITH

It is certified that error appears in the above-identified patent and that said Letters Patent is hereby corrected as shown below:

Change the title from:

"WATER SAVING TOILET CONTROL VALVE"

to:

--A WATER SAVING ANTI-SYPHON TOILET CONTROL VALVE--

Signed and Sealed this

Twenty-seventh Day of November 1984

[SEAL]

Attest:

GERALD J. MOSSINGHOFF

Attesting Officer   Commissioner of Patents and Trademarks